Figure 1:
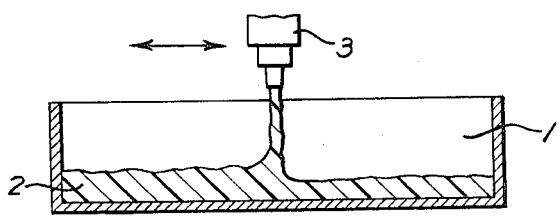

Dec. 13, 1966 J. L. EAKIN 3,291,873
MOLDING CELLULAR POLYURETHANE PLASTICS
Filed Oct. 21, 1963

INVENTOR.
JAMES L. EAKIN.
BY
ATTORNEY.

United States Patent Office 3,291,873
Patented Dec. 13, 1966

3,291,873
MOLDING CELLULAR POLYURETHANE PLASTICS
James L. Eakin, Aliquippa, Pa., assignor to Mobay Chemical Company, Pittsburgh, Pa., a corporation of Delaware
Filed Oct. 21, 1963, Ser. No. 317,451
3 Claims. (Cl. 264—54)

This invention relates to an improvement in the molding of cellular polyurethanes and, more particularly, to an improved method of molding cellular polyurethanes which avoids defects in the interior of molded cellular polyurethanes.

In U.S. Patents 3,006,033 and 3,056,168, methods of molding cellular polyurethanes are disclosed wherein the foamable polyurethane composition is placed inside the mold and a cover plate is placed over the top of the mold, then the foamable composition is allowed to expand and it pushes the cover plate up in a vertical direction. Following the so-called top of the rise, the cover plate exerts a compressive pressure on the foamable composition while it is still plastic and causes the plastic composition to conform to the dimensions of the mold and the underside of the cover plate. There the composition remains until it becomes nonplastic. Then the cover plate is removed and the molded item is stripped from the mold.

Many problems are encountered in this procedure including internal densification, holes on the outer surface of the molded item, voids or large bubbles in the center of the molded item, fissures, often repeated in various specific locations in the block of foam and especially at the corners of the molded block of foam. These and many other problems plague the foam molder.

Cover plates have heretofore been constructed so that the opening between the top of the mold cavity and the cover plate, which is created as the foamable composition expands and pushes the cover plate up, varies as the foam expands. Thus, there is a variation between the amount of confining pressure which is exerted on the foamable composition between the time that it first begins to exert pressure on the cover plate and the top of the rise then the cover plate is at its maximum height. Frequently, under these conditions, there will be a tangential escape of gas from the foaming mass while it is in a plastic state which leaves a corresponding separation or fissure in the foam. This fissure makes the molded block of foam completely unsatisfactory for most applications.

It is therefore an object of this invention to provide an improved method of molding cellular polyurethane plastics. Another object of this invention is to provide a method of molding cellular polyurethanes which is substantially devoid of the foregoing disadvantages. Still another object of this invention is to provide an improved method of molding cellular polyurethane plastics in a mold which has a floating lid which rises with the foam and then exerts a compressive pressure to cause the still plastic foam to conform to the configuration of the inside of the mold. Still another object of this invention is to provide an improved mold design for the molding of cellular polyurethane plastics.

The foregoing objects and others which will become apparent from the following description are accomplished in accordance with the invention, generally speaking, by providing for the maintenance of substantially constant pressure inside the mold in a process for molding cellular polyurethane plastics wherein a foamable composition capable of producing a cellular polyurethane plastic is introduced into a mold cavity; the mold cavity is then covered with a cover plate and the foamable composition is allowed to expand and contact the cover plate, moving it upward in a vertical direction and then the plate exerts a compressive force on the foamable composition to cause it to conform to the configuration defined by the cavity of the underside of the cover plate. The foam remains in the mold until it has reached a nonplastic state and then the cover plate is removed and the molded item is stripped from the mold.

Figure 2:
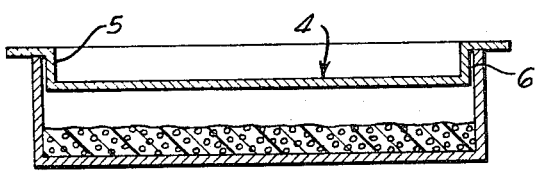
Figure 3:
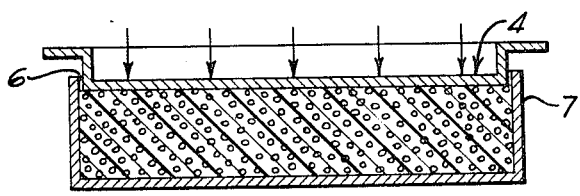
Figure 5:
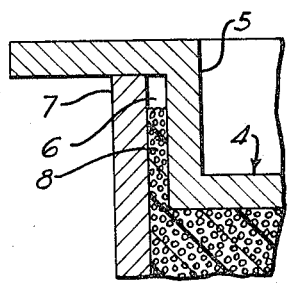
Figure 4:
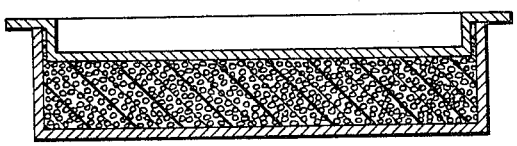
Figure 6:
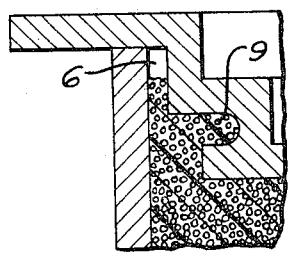

The invention is further illustrated in the accompanying drawing. FIGURE 1 is a cross section of a mold cavity 1 as the foamable composition 2 is being introduced by means of mixing head 3. FIGURE 2 shows the same mold cavity with a cover plate 4 in place as the foamable composition is expanding. The cover plate 4 has a vertical member 5 extending into the mold cavity to provide a constant opening 6 as the cover plate 4 is pushed upward by the foamable composition. In FIGURE 3 the polyurethane composition has reached its maximum expansion and the cover plate 4 is as high as it shall ever rise along the walls 7 of the mold cavity. In FIGURE 3 it can be seen that the opening 6 remains constant from the lowest position that the cover plate can assume as in FIGURE 2 to its highest point as in FIGURE 3. The compressive pressure exerted by the cover plate is less than the pressure exerted by the expanding polyurethane composition. After complete expansion of the foamable polyurethane composition, the compressive force of the cover plate is sufficient to force the still plastic polyurethane composition into the mold and cause it to conform to the configuration defined by the cavity mold as in FIGURE 4. FIGURE 5 is an enlarged view of the cover plate in the vicinity where it comes in contact with the upper wall of the mold cavity. The opening 6 is now filled with extrudate 8. In other words, any excess foamable composition rises into opening 6, the cross-sectional area of which remains constant throughout the rise and fall of the foam so that there is no lateral or vertical shift of the plastic composition on itself resulting in a fissure or split at the corners of the mold. In some types of moldings it is necessary to have a lip at the edge of the mold to engage a wire spring and thus fasten, for example, a molded topper pad to the springs in an automobile seat cushion. It is very important that this lip, which is often only ¼ inch to 1 inch in thickness, be produced from foam having excellent physical properties. FIGURE 6 shows a configuration of the mold with a lip 9 produced on the molded item. It also shows opening 6 above the lip 9 to avoid any possibility of a fissure or split in this crucial portion of the molded item.

Figure 7:
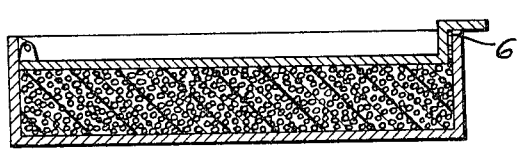

Any suitable method of providing a constant pressure in the mold at the crucial time may be used. It has been found, however, that the molding of cellular polyurethanes is facilitated by the particular mold design shown in the drawings. Variations are nevertheless possible for example, one side of the mold lid may be clamped, as shown in FIGURE 7 so long as the opening 6 for the release of pressure remains substantially constant. Of course, it is always necessary to have at least enough of the foamable composition to completely fill the mold and in order to insure that there is enough of the foamable composition, it is desirable to use from about 1.005 to about 1.1 times the amount of foamable composition required to fill the mold cavity when the cover plate is in its lowest position. Furthermore, it is desirable to use a cover plate which has sufficient weight to exert a compressive pressure of from about 10 to about 90 percent of the maximum upward pressure exerted by the expanding foamable composition.

It is desirable in accordance with the method of the invention to follow many of the heretofore known techniques in the molding of cellular polyurethanes and in formulations suitable therefor. Thus, the invention is most advantageously employed in the production of cellular polyurethane plastics having a maximum thickness of about 5 inches. It is desirable to use as the foamable composition a reaction mixture of an organic polyisocyanate, an organic compound containing at least 2 active hydrogen containing groups in the molecule as determined by the Zerewitinoff method and a blowing agent which preferably comprises water. The components of the flexible composition are mixed together preferably in a suitable machine mixer such as that disclosed, for example, in U.S. Reissue 24,514 to Hoppe et al. The foamable composition is then introduced from the machine into a mold cavity which may be made of any suitable material but is preferably made of metal about ⅛ inch to about ⅜ inch thickness. Aluminum molds are preferred but other suitable metals such as steel, for example, may be used. Aluminum as a material for construction of the mold is preferred because it is often desirable to heat the mold while the composition is expanding in order to proximate the exotherm temperature created by a free rise or large mass of cellular polyurethane. Heating of the closed mold after it has been changed is preferably done with radiant heaters and the heating is preferably at such a rate that the temperature of the mold is raised concurrently with the increase in temperature of the reaction mixture so as to conserve the exotherm of the reaction.

Any suitable organic polyisocyanate may be used for the preparation of the cellular polyurethane plastic of this invention, such as, for example, those disclosed in United States Reissue Patent 24,514 to Hoppe et al., issued August 12, 1958. Arylene diisocyanates are preferred, such as, for example, 2,4-toluylene diisocyanate, 2,6-toluylene diisocyanate, p,p′-diphenyl methane diisocyanate, 1,5-naphthalene diisocyanate and the like. Particularly suitable arylene diisocyanates for this reaction are a mixture of about 20 percent 2,6-toluylene diisocyanate and about 80 percent 2,4-toluylene diisocyanate.

Any suitable organic compound containing at least two active hydrogen containing groups as determined by the Zerewitinoff test may be used, such as, for example, hydroxyl polyesters, polyhydric polyalkylene ethers, polyhydric polythioethers, polyacetals and polyester amides. It is preferred that the organic compound have a molecular weight above about 500 and most preferably within the range of about 1000 to 5000, an hydroxyl number within the range of about 25 to about 150 and most preferably within the range of about 35 to 80 and acid numbers, where applicable, preferably below about 5 and most preferably below about 1.

Any suitable hydroxyl polyester may be used, such as, for example, the reaction product of a polycarboxylic acid with an excess of a polyhydric alcohol. Any suitable polycarboxylic acid may be used, such as, for example, adipic acid, sebacic acid, phthalic acid, terephthalic acid, maleic acid, malonic acid, thiodipropionic acid and the like. Any suitable polyhydric alcohol may be used, such as, for example, ethylene glycol, propylene glycol, butylene glycol, amylene glycol, glycerine, trimethylol propane, pentaerythritol and the like.

Any suitable polyhydric polyalkylene ether may be used such as for example, the condensation product of alkylene oxides and a polyhydric alcohol. Any suitable alkylene oxide may be used such as, for example, ethylene oxide, propylene oxide, butylene oxide, amylene oxide and the like. It is preferred to employ polyhydric polyalkylene ethers prepared from alkylene oxides having from two to five carbon atoms, such as, for example, polypropylene ether glycol, polyethylene ether glycol, polybutylene ether glycol or mixtures thereof having a molecular weight of at least about 500. Moreover, the condensation product of the aforementioned alkylene oxides and a polyhydric alcohol having from 2 to 4 hydroxyl groups, such as, for example, ethylene glycol, propylene glycol, trimethylol propane, glycerol, triethanol amine, pentaerythritol and the like may be used. The polyhydric polyalkylene ethers may be prepared by any known process, such as, for example, by the process described by Wurtz in 1859 and in "Encyclopedia of Chemical Technology," volume 7, pages 257 to 262, published by Interscience Publishers, Inc., 1951 or in U.S. Patent 1,922,459.

Any suitable polyhydric polythioether may be used, such as, for example, the reaction product of a polyhydric alcohol with a thioether glycol. Any suitable polyhydric alcohol may be used, such as, for example, ethylene glycol, propylene glycol, butylene glycol, trimethylol propane, pentaerythritol, and the like. Any suitable thioether glycol may be used, such as, for example, diethylene glycol thioether and the like.

Any suitable polyacetal may be used, such as, for example, the reaction product of an aldehyde, such as, for example, formaldehyde, with a polyhydric alcohol, such as, for example, ethylene glycol or one of the other polyhydric alcohols disclosed above for reaction with the polycarboxylic acids and/or alkylene oxides used in the preparation of the hydroxyl polyesters and polyethers respectively.

Any suitable polyester amide may be used, such as, for example, the reaction product of an amine, such as ethylene diamine and an alkylene glycol such as ethylene glycol with a polycarboxylic acid as disclosed for the preparation of the hydroxyl polyesters.

One may also employ tetrahalo hydrocarbons in conjunction with the balance of the components of the cellular polyurethane plastic, such as, for example, trichlorofluoromethane and the like to exhibit a beneficial effect on the properties of the cellular polyurethane plastic. The employment of these compounds is not an essential feature of the invention, however.

It is often advantageous to carry out the reaction in the presence of a catalyst. Any suitable catalyst may be used such as, for example, dibutyl tin di-2-ethyl hexoate, stannous octoate, triethylene diamine, N-ethyl morpholine, N-methyl morpholine, dimethylauryl amine, and the like. In any case and especially in the production of cellular polyurethane plastics based on the above described polyhydric polyalkylene ethers by a one step process, it is advantageous to employ mixtures of the metal containing catalyst and the tertiary amine catalyst.

In many cases it is desirable and indeed in some cases it may be necessary to carry out the reaction in the presence of a stabilizer or emulsifier. In the production of cellular polyurethane plastics based on polyhydric polyalkylene ethers by a one-step process wherein the water, an organic polyisocyanate and a polyhydric polyalkylene ether are mixed together substantially simultaneously in a single step and inserted into the mold, it has been found necessary to carry out the reaction in the presence of a silicone oil which contains some mixed oxyalkylene block copolymer in the molecule. Suitable silicone oils for this process may be found in U.S. Patent 2,834,748 to Bailey et al., issued May 13, 1958. In the preparation of cellular polyurethane plastic from organic polyisocyanate modified polyhydric polyalkylene ethers having terminal —NCO groups by reaction thereof with water, it is advantageous to employ a substantially linear dimethyl polysiloxane having a viscosity of about 50 cts. at 25° C. The same silicone oil may be used as a stabilizer in the production of a cellular polyurethane plastic base on polyesters. Emulsifiers such as the sulfonated oils, for example, sulfonated castor oil, are also suitable.

Thin sections of cellular polyurethane plastic have found many uses. However, it has been difficult to obtain thin sections of cellular polyurethane plastic without the necessity of preparing a large section having a thickness greater than about 4 inches and then slicing the thicker section into thinner parts. These thinner parts may be used, for example, for wall tile, headliners for automobiles, in the upholstery industry, for cushioning and the like, as well as other applications. The molded cellular polyurethane plastics having a maximum thickness of about 4 inches are also suitable for the above applications and in addition, it has been found particularly advantageous to prepare thin molds for use as topper pads for automobile seat cushions and the like.

The invention is further illustrated by the following examples in which the parts are by weight.

*Example 1*

About 100 parts of a trihydric polyalkylene ether obtained from the condensation of propylene oxide with glycerine in the molar ratio of about 50:1 and condensed to a molecular weight of about 3000 and having an hydroxyl number of about 56, about 42.5 parts of a mixture of 80 percent 2,4-toluylene diisocyanate and 20 percent 2,6-toluylene diisocyanate, about 3.5 parts of water, about 1.5 parts of a silicone oil having the formula

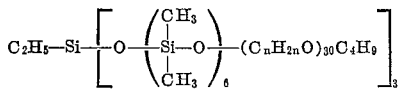

wherein ($C_nH_{2n}O$) is a mixed polyoxyethylene and oxypropylene block copolymer containing about 17 oxyethylene units and about 13 oxypropylene units, about 0.2 parts of triethylene diamine and about 0.07 parts of dibutyl tin di-2-ethyl hexoate were combined in a machine mixer such as disclosed in U.S. Reissue Patent 24,514 to Hoppe et al., issued August 12, 1958, and inserted into an aluminum mold shell which had been previously heated to a temperature of about 40° C. The temperature of the mixture of liquid reactive ingredients at the time that they were placed in the aluminum mold shell was about 30° C. A cover plate as in FIGURE 2 was placed over the the top of the mold and placed in an oven equipped with radiant heaters i.e. chrome ribbon heaters within about 20 seconds after the mold was charged. The temperature of the covered mold was raised from about 30° C. to about 100° C. in about 1½ minutes and then removed and allowed to stand at room temperature for an additional 8 minutes. The mold cover was removed and the molded cellular polyurethane plastic was taken from the mold and post-cured for about 30 minutes in atmospheric steam and then cured for about one hour at about 130° C. The resulting pad had the following physical properties:

| | |
|---|---|
| Density | 2.2 lbs./ft.³ |
| Tensile strength | 20 lbs/in.² |
| Elongation | 300%. |
| Tear strength | 3 lbs./in.² |
| Compression 25% rest | 18 lbs./50 in.² |
| Compression set | 15%. |

The molding was free of splits and fissures.

*Example 2*

About 69 parts of a trihydric polyalkylene ether obtained from the condensation of propylene oxide with glycerine in the molar ratio of about 50:1 condensed to a molecular weight of about 3000 and having an hydroxyl number of about 56, about 23 parts of a polypropylene ether glycol having a molecular weight of about 2000 and an hydroxyl number of about 56, about 41.5 parts of a mixture of 80 percent, 2,4-toluylene diisocyanate and 20 percent 2,6-toluylene diisocyanate, about 35 parts of water, about 2.0 parts of a silicone oil having the formula

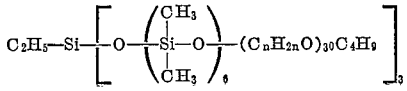

It is to be understood that any of the other suitable organic polyisocyanates, blowing agents, organic compounds containing at least two active hydrogen groups in the molecule, catalysts, stabilizers and the like described herein, can be substituted for the particular ones employed in the preceding examples with equally satisfactory results. Moreover, any temperature within the ranges specified above could have been substituted for those in the preceding examples with equally satisfactory results.

Although the invention has been described in considerable detail for the purpose of illustration, it is to be understood that such detail is solely for this purpose and that variations can be made therein by those skilled in the art without departing from the spirit and scope of the invention except as set forth in the claims.

What is claimed is:

1. In a process for the preparation of a molded cellular polyurethane plastic by a process which comprises introducing into the cavity of a mold a flexible polyurethane composition, covering the mold with a cover plate, allowing said foamable polyurethane composition to expand inside the covered mold whereby said cover plate rises in a vertical direction when contacted by said expanding foamable composition and said cover plate exerts a compressive pressure on said foamable composition while said foamable composition is still plastic to make the resulting compressed foam conform to the dimensions defined by the cavity of the mold and the underside of said cover plate, allowing said compressed foam to become nonplastic, removing said cover plate and stripping the molded foam from the mold, the improvement which comprises providing for substantially constant release of pressure at the junction of the cover plate and the mold cavity from the time that the foamable composition reaches the underside of the cover plate until completion of the rise.

2. The process of claim 1 wherein the compressive forces exerted on the foamable composition by the cover plate is from about 10 to about 90 percent of the maximum upward pressure exerted by said expanding foamable composition and a constant opening for release of pressure is provided at the junction of the cover plate and mold cavity.

3. The process of claim 1 wherein said foamable polyurethane composition comprises an organic polyisocyanate, a polyhydric polyalkylene ether and water.

References Cited by the Examiner

UNITED STATES PATENTS

| | | | |
|---|---|---|---|
| 1,515,475 | 11/1924 | Goodwin | 264—55 XR |
| 2,590,156 | 3/1952 | Carpenter | 264—55 XR |
| 2,649,620 | 8/1953 | Miller | 264—54 |
| 2,769,205 | 11/1956 | Pfleumer | 264—55 |
| 3,006,033 | 10/1961 | Knox | 264—55 |
| 3,056,168 | 10/1962 | Terry | 264—55 |
| 3,163,687 | 12/1964 | Einhorn | 264—54 |

OTHER REFERENCES

Knox, R. E.: "Molding of prepolymer based resilient urethane foam," in Rubber World, vol. 139, No. 5, February 1959, pp. 685–692.

Knox, R. E.; Dupont Hylene Foam Bulletin, "Trouble-shooting guide for molding one-shot resilient polyether foam," November 30, 1960, all pages.

ROBERT F. WHITE, *Primary Examiner.*

ALEXANDER H. BRODMERKEL, *Examiner.*

P. E. ANDERSON, *Assistant Examiner.*